US011175899B2

(12) United States Patent
Kalaskar et al.

(10) Patent No.: US 11,175,899 B2
(45) Date of Patent: Nov. 16, 2021

(54) SERVICE UPGRADE INTEGRATION FOR VIRTUALIZED COMPUTING ENVIRONMENTS

(71) Applicant: VMware, Inc., Palo Alto, CA (US)

(72) Inventors: Naveen Kumar Kalaskar, Freemont, CA (US); Sudipto Mukhopadhyay, Pleasanton, CA (US); Naveen Chandra Gorijala, San Jose, CA (US); Swapneel Dattaram Ambre, Milpitas, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/386,980

(22) Filed: Apr. 17, 2019

(65) Prior Publication Data

US 2020/0334027 A1    Oct. 22, 2020

(51) Int. Cl.
| | | |
|---|---|---|
| *G06F 9/44* | (2018.01) | |
| *G06F 9/445* | (2018.01) | |
| *G06F 9/455* | (2018.01) | |
| *G06F 8/65* | (2018.01) | |

(52) U.S. Cl.
CPC ............ *G06F 8/65* (2013.01); *G06F 9/45533* (2013.01)

(58) Field of Classification Search
CPC ................................ G06F 8/65; G06F 9/45533
See application file for complete search history.

(56) References Cited

U.S. PATENT DOCUMENTS

| | | | | |
|---|---|---|---|---|
| 7,310,801 | B2 * | 12/2007 | Burkhardt | G06F 8/65 717/169 |
| 10,089,108 | B1 * | 10/2018 | Noble | G06F 8/65 |
| 2004/0060035 | A1 * | 3/2004 | Ustaris | G06F 8/71 717/100 |
| 2005/0160434 | A1 * | 7/2005 | Tan | G06F 9/465 719/331 |
| 2014/0082403 | A1 * | 3/2014 | Kraev | G06F 1/14 713/502 |
| 2014/0344400 | A1 * | 11/2014 | Varney | H04L 41/50 709/217 |
| 2016/0132316 | A1 * | 5/2016 | Hu | G06F 8/65 717/171 |
| 2016/0232116 | A1 * | 8/2016 | Bone | H04L 63/10 |
| 2016/0283219 | A1 * | 9/2016 | Banford | G06F 8/658 |
| 2017/0003950 | A1 * | 1/2017 | Newell | G06F 8/61 |

(Continued)

OTHER PUBLICATIONS

Karthick Ramachandran, A Remote Attestation Infrastructure for Verifying the Application of Software Updates, 2017, pp. 317-324. https://ieeexplore.ieee.org/stamp/stamp.jsp?tp=&arnumber=7987294 (Year: 2017).*

(Continued)

*Primary Examiner* — Mongbao Nguyen
(74) *Attorney, Agent, or Firm* — Thomas | Horstemeyer, LLP (57) ABSTRACT

Examples for upgrading third-party services for a virtualized computing environment are discussed. A request is obtained to upgrade services associated with the virtualized computing environment. An upgrade bundle is obtained that includes a manifest defining an order for upgrading the third-party services. In the order defined in the manifest, each third-party upgrade is executed and a status log is modified to indicate the completion of the upgrade.

20 Claims, 3 Drawing Sheets

(56) References Cited

U.S. PATENT DOCUMENTS

| | | | |
|---|---|---|---|
| 2017/0003951 A1* | 1/2017 | Newell | G06F 9/45558 |
| 2017/0060570 A1* | 3/2017 | Miller | G06F 8/71 |
| 2018/0004503 A1* | 1/2018 | OlmstedThompson | G06F 8/65 |
| 2018/0067841 A1* | 3/2018 | Mahimkar | H04W 24/02 |
| 2018/0157480 A1* | 6/2018 | Ivanov | G06F 8/61 |
| 2018/0173517 A1* | 6/2018 | Shantharam | G06F 8/65 |
| 2018/0189046 A1* | 7/2018 | Kunisetty | H04L 41/082 |
| 2018/0241617 A1* | 8/2018 | Radzikowski | H04L 67/325 |
| 2019/0163464 A1* | 5/2019 | Compton | G06F 8/65 |
| 2019/0354405 A1* | 11/2019 | DeArment | G06F 9/44 |

OTHER PUBLICATIONS

Mohamed M. Saad, Processing Transactions in a Predefined Order, 2018, pp. 1-15. https://dl.acm.org/doi/pdf/10.1145/3293883.3295730 (Year: 2018).*

Youwei Wang, Clover: A distributed file system of expandable metadata service derived from HDFS, 2012, pp. 126-134. https://ieeexplore.ieee.org/stamp/stamp.jsp?tp=&arnumber=6337773&isnumber=6337766 (Year: 2012).*

* cited by examiner

FIG. 1

```
{
  "manifestVersion": "2.4.2",
  "manifestElements": [
    {
      "executable": "sddc-support/bin/sos_upgrade.py",
      "executableName": "sddc-support",
      "executableType": "PYTHON",
      "parameters": {
        "UPGRADE_ID": " ",
        "RESOURCE_ID": " ",
        "UPGRADE_DIR": " ",
        "STATUS_FILE": " ",
        "OUTPUT_FILE": " ",
        "ELEMENT_LOG_DIR": " "
      },
      "summary": "SoS upgrade bundle as part of LCM upgrade. SoS upgraded to 2.3.0 in SDDC Manager",
      "outputFile": "sddc-support/logs/sos_upgrade.log",
      "statusFile": "sddc-support/logs/sos_upgrade.status",
      "stage": "SOS_UPGRADE_STAGE",
      "timeout": 900000
    },{
      "executable": "baseos-rpm-upgrades/bin/upgrade.py",
      "executableName": "baseos-rpm-upgrades",
      "executableType": "PYTHON",
      "parameters": {
        "UPGRADE_ID": " ",
        "RESOURCE_ID": " ",
        "UPGRADE_DIR": " ",
        "STATUS_FILE": " ",
        "OUTPUT_FILE": " ",
        "ELEMENT_LOG_DIR": " "
      },
      "summary": "Upgrading base OS rpms as part of LCM self-upgrade",
      "outputFile": "baseos-rpm-upgrades/logs/baseos_upgrade.log",
      "statusFile": "baseos-rpm-upgrades/logs/baseos_upgrade.status",
      "stage": "BASEOS_UPGRADE_STAGE",
      "timeout": 1000000
    },{
      "executable": "jre/bin/jre_upgrade.py",
      "executableName": "jre",
      "executableType": "PYTHON",
      "parameters": {
        "UPGRADE_ID": " ",
        "RESOURCE_ID": " ",
        "UPGRADE_DIR": " ",
        "STATUS_FILE": " ",
        "OUTPUT_FILE": " ",
        "ELEMENT_LOG_DIR": " "
      },
      "summary": "Upgrading JRE as partof LCM self-upgrade",
      "outputFile": "jre/logs/jre_upgrade.log",
      "statusFile": "jre/logs/jre_upgrade.status",
      "stage": "JRE_UPGRADE_STAGE",
      "timeout": 1000000
    }
  ]
}
```

SERVICE UPGRADE INTEGRATION FOR VIRTUALIZED COMPUTING ENVIRONMENTS

BACKGROUND

Data centers include physical and virtual components that, when executed, provide web services, cloud computing environments, virtualization environments, as well as other computing systems. Data centers can include hardware and software to provide computer virtualization services, which relate to the creation of a virtualized version of a physical device, such as a server, a storage device, a central processing unit (CPU), a graphics processing unit (GPU), or other computing resources.

Data centers can also include virtual machines (VMs), which include emulations of a computer system that can be customized to include a predefined amount of random access memory (RAM), storage space, as well as other computing resources that emulate a physical machine. Operating a data center can involve maintaining hundreds to thousands of CPUs, GPUs, and other physical hardware, as well as corresponding software. The software can be provided by different third-party providers which can result in software upgrades and patches being available at different release cycles. Due to dependencies that can be present between the different types of software used within the computing infrastructure of the data center, upgrading the software without consideration of the dependencies can be problematic and cause complications.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2 is a drawing of an example manifest that defines an example sequence for upgrading software components in the virtualized environment.

DETAILED DESCRIPTION

The present disclosure relates to automating service upgrades within the computing infrastructure of a software-defined data center (SDDC) while considering the interdependencies between the services. As upgrades and patches become available for services and other types of applications installed on host devices within a data center, data center operators can request an upgrade of the installed services. However, due to possible dependencies between different services, complications can occur if one of the services is upgraded prior to other services. These complications could result in inoperability of one or more of the services which can affect the overall operation of the data center. Accordingly, performing automated upgrades of services based on a predetermined sequence that factors the interdependencies between the services can reduce complications with service upgrades.

A software defined data center (SDDC) infrastructure can include different software-based systems that are used for the overall implementation and operation of a virtualized computing environment for an enterprise. The software-based systems can be created using generic third-party software services in combination with native services. Patches and upgrades can become available for the different types of software services used to create the systems of the virtualized computing environment. One implementation of the virtualized computing environment can include a life cycle manager that can manage the deployment, upgrades, and configuration of the different software-based systems and services.

To simplify the deployment and upgrades of a software-based system and provide a single unified process for upgrading the services, an upgrade bundle can be generated. The upgrade bundle can define the individual service upgrades associated with an overall upgrade of a software-based system of the virtualized computing environment. When a system or portion of a system is to be upgraded, the upgrade bundle can include a list of service upgrades associated with the system upgrade.

The upgrade bundle can include a manifest that defines a sequence for executing the available service upgrades. A predefined sequence can be based on a determination of an upgrade order given the different interdependencies between the services to be upgraded. For example, a user can review the updates and security issues for a third-party service upgrade release and determine if one service should be installed prior to another service. In one example, the user can identify that a version associated with a first service is incompatible with a version of a second service. Therefore, the user can determine that the first service should be upgraded before the second service to avoid the incompatibility issues associated with the different versions. The manifest can be generated based on the determination of the upgrade order.

The manifest can further identify a location of the executable code associated with the upgrade for each of the different services. The services can include third-party services, native services, or a combination of third-party and native services. Using the resources provided in the manifest, an upgrade manager can sequentially execute the upgrades for each of the services based on the predefined sequence. As a result, the services can be upgraded automatically in an order that prevents complications from interdependencies. In addition, the manifest is able to provide a centralized list and location of the different service upgrades that are associated with a software system upgrade and are provided by different service providers. This can provide a simplified process for version management as the versions of the services to be upgraded can be associated with a given system upgrade. For example, the different versions of the services can be associated with a version of the software system that they are used to implement.

During the upgrade of the multiple services of a software-based system, a status log can be generated and updated to track the status of each upgrade in a single unified view. The status log can provide status information and any failure or error information associated with each service upgrade. As such, an administrator tracking the service updates for the different service upgrades can view the status and failure information in a single unified view instead of having to log in each individual service to track the status and view any corresponding errors or failures.

Figure 1:
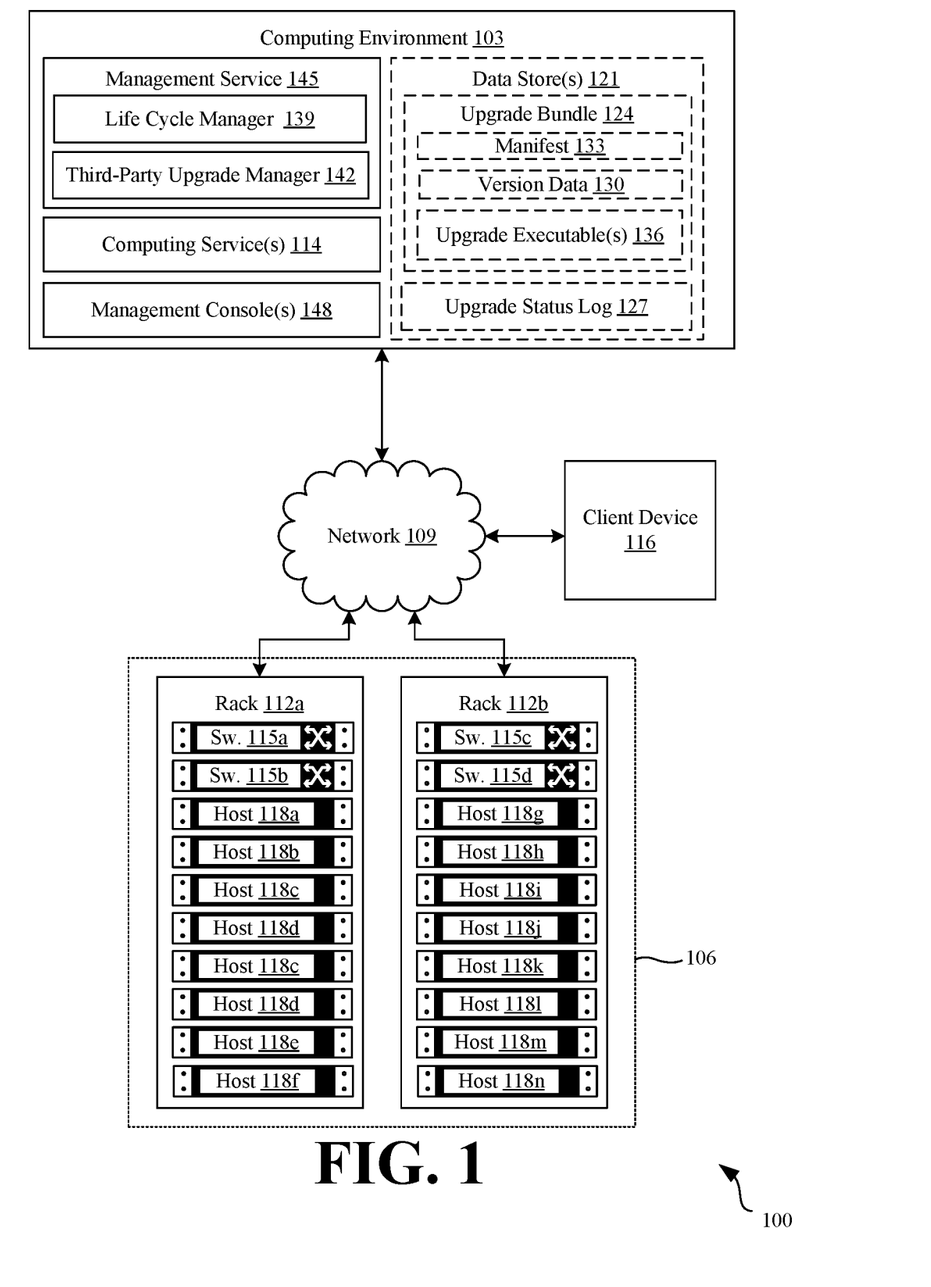
FIG. 1 is a drawing of an example of a network infrastructure including components connected through a network including a management service for upgrading software components in a virtualized environment.

Turning now to FIG. 1, an example of a networked environment 100 is shown. The networked environment 100 can include a computing environment 103 and computing systems 106 in communication with one another over a network 109. The network 109 can include, for example, the Internet, intranets, extranets, wide area networks (WANs), local area networks (LANs), wired networks, wireless networks, other suitable networks, or any combination of two or more such networks.

The networks of the networked environment 100 can include satellite networks, cable networks, Ethernet networks, telephony networks, and other types of networks. The computing systems 106 can include devices installed in racks 112 which can make up a server bank, aggregate computing system, or a computer bank in a data center or other like facility. In some examples, the computing systems 106 can include high-availability computing systems. A high-availability computing system is a group of computing devices that acts as a single system and provides a continuous uptime. The devices in the computing systems 106 can include any number of physical machines, virtual machines, virtual appliances, and software, such as operating systems, drivers, hypervisors, scripts, and applications.

The computing systems 106 and the hardware and software components contained therein can include infrastructure of the networked environment 100 that can provide one or more computing services 114. Computing services 114 can include virtualization services. For instance, the computing services 114 can include those that serve virtual desktops to end users. Thus, the computing environment 103 can also be described as a virtual desktop infrastructure (VDI) environment in some examples. In other examples, the computing services 114 can include those that provide a public cloud computing environment, a private cloud computing environment, or a hybrid cloud computing environment (a combination of a public and private cloud computing environment). Therefore, the computing environment 103 can be referred to as a cloud computing environment in some examples. Further, the computing services 114 can include those that provide data to one or more on-premise devices, which can include computing devices physically located in the premises of an enterprise and communicating over an enterprise network having traffic diverted through a firewall. The computing services 114 can include native services as well as third-party services implemented by third-party service providers.

In some examples, the computing environment 103 can include an enterprise computing environment that includes hundreds or even thousands of physical machines, virtual machines, and other software implemented in devices stored in racks 112 (e.g., 112a, 112b), distributed geographically, and connected to one another through the network 109. A virtual machine or virtual appliance is implemented using at least one physical device, such as a server or other computing device.

The devices in the racks 112 can include computing resources. The computing resources can include physical computing hardware, such as memory and storage devices, switches 115 (e.g., 115a . . . 115d), hosts 118 (e.g., 118a . . . 118n), graphics cards, central processing units (CPUs), power supplies, and similar devices. The devices, such as hosts and switches, can have dimensions suitable for quick installation in slots on the racks 112. In some examples, the hosts 118 can include requisite physical hardware and software to create and manage virtualization infrastructure or a cloud computing environment. Also, in some examples, the computing resources can also include virtual computing resources, such as virtual machines or other software.

The hosts 118 can include a pre-configured hyper-converged computing device where a hyper-converged computing device includes pre-tested, pre-configured, and pre-integrated storage, server and network components, including software, that are positioned in an enclosure installed in a slot on a rack 112.

Each host 118 can include one or more virtual machines as well as a hypervisor. In some examples, the hypervisor can be installed on a host 118 to support a virtual machine execution space within which one or more virtual machines can be concurrently instantiated and executed. Additionally, the hypervisor can include the ESX hypervisor by VMWARE, the ESCI hypervisor by VMWARE, or similar hypervisor, in some examples. The computing systems 106 can be scalable, meaning that the computing systems 106 in the networked environment 100 can increase or decrease dynamically to include or remove hosts 118, switches 15, GPUs, power sources, and other components, without degrading performance of a virtualization or cloud computing environment.

One or more computing services 114 can be provided through execution of an application or service on one or more of the virtual machines. The computing services 114 can include, for example, web services in some examples that can be invoked by submitting requests over the network 109 for particular actions to be performed or for particular data to be returned. Additionally, in some examples, the computing services 114 can be implemented in computing containers. Each of the containers can include a self-contained execution environment having its own CPU, memory, block input/output (I/O), and network resources which are isolated from other containers. In some examples, a single one of the containers can implement a single one of the computing services 114.

The computing environment 103 can include a server or any other system providing computing capability. Alternatively, the computing environment 103 can include one or more computing devices that are arranged, for example, in one or more server banks, computer banks, computing clusters, or other arrangements. The computing environment 103 can include a grid computing resource or any other distributed computing arrangement. The computing devices can be located in a single installation or can be distributed among many different geographical locations. Although shown separately from the computing systems 106, it is understood that in some examples the computing environment 103 can be included as all or a part of the computing systems 106.

The computing environment 103 can include or be operated as one or more virtualized computer instances in some examples. For purposes of convenience, the computing environment 103 is referred to in the singular. As the computing environment 103 communicates with the computing systems 106 and client devices 116 over the network 109, sometimes remotely, the computing environment 103 can be described as a remote computing environment 103 in some examples. Additionally the computing environment 103 can be implemented in hosts 118 of a rack 112 and can manage operations of a virtualized or cloud computing environment through interaction with the computing services 114.

The computing environment 103 can include a data store 121. The data store 121 can include memory of the computing environment 103, mass storage resources of the computing environment 103, or any other storage resources on which data can be stored by the computing environment 103. The data store 121 can include memory of the hosts in the racks 112 in some examples. For instance, the data store 121 can include one or more relational databases, such as structure query language (SQL) databases, non-SQL databases, or other relational or non-relational databases. The data stored in the data store 121, for example, can be associated with the operation of the services or functional entities described below.

The data store 121 can include an upgrade bundle 124 and an upgrade status log 127. The upgrade bundle 124 includes a bundle of upgrades and patches for software services associated with a software-based system of the data center. The upgrade bundle 124 can include version data 130, a manifest 133, and upgrade executables 136. The version data 130 can define a version associated with a particular system upgrade. For example, assume that an upgrade bundle 124 corresponds to an upgrade of the life cycle manager (LCM) 139. The version data 130 can identify the particular version of the LCM 139 with respect to the particular upgrade bundle 124. There can be multiple upgrade bundles associated with different software-based systems of the data center and different versions of the different systems.

The manifest 133 identifies the different upgrade elements 202 (FIG. 2) that are available with respect to an upgrade of a software-based system of the virtualized computing environment. Each upgrade element 202 can correspond to a service that has an available upgrade or patch. The upgrade elements 202 can be listed in the manifest according to an order in which each element is to be upgraded based on dependencies between the different services. For each upgrade element 202, the manifest 133 can include additional information including an executable handle 204 (FIG. 2) identifying a location of the upgrade executable 136, an executable name, an executable type, executable parameters, status file location, status summaries, a timeout value, and version information.

The upgrade executable 136 corresponds to executable code used to upgrade the particular service. Although the upgrade executable 136 is shown as being included in the upgrade bundle 124, the upgrade executable 136 can be located at a remote location associated with a third-party service provider or can be located in the data store 121 apart from the upgrade bundle 124. Regardless of the location of the upgrade executable 136, the executable handle 204 included in the manifest 133 can be used to call the upgrade executable 136 and initiate execution of the service upgrade.

The upgrade status log 127 includes status data associated with each of the individual upgrades of the services. The upgrade status log 127 can be modified with status summaries during each upgrade with respect to completion, status, error detection, or other types of status information. In some examples, the third-party upgrade manager 142 or the life cycle manager 139 can obtain status information from status files created during the execution of a corresponding upgrade executable 136. The third-party upgrade manager 142 or the life cycle manager 139 can modify the upgrade status log 127 to include information obtained from the respective status files. In some examples, the manifest 133 includes predefined summaries that can be included in the upgrade status log 127 based the particular service upgrade. The upgrade status log 127 can provide a single unified view for an administrator to review during the upgrade process thereby eliminating the need for the administrator to log into each service separately to initiate the upgrade and track the status upgrade.

The components executed on the computing environment 103 can include a management service 145, computing services 114, a management console 148 as well as other applications, services, processes, systems, engines, or functionality not discussed in detail herein. The management service 145 can oversee the operation of the networked environment 100 through management of the computing systems 106 as well as the physical and virtual computing resources that make up the computing systems 106. In some examples, an enterprise, organization, or other entity can operate the management service 145 to oversee or manage the operation of devices in the racks 112, such as servers, switches, GPUs, power supplies, cooling systems, and other components.

The physical and virtual components of the computing systems 106 can process workloads. Workloads can refer to the amount of processing that a server, switch, GPU, or other physical or virtual component has been instructed to process or route at a given time. The workloads can be associated with virtual machines, public cloud services, private cloud services, hybrid cloud services, virtualization services, device management services, or other software executing on the servers. For instance, the workloads can include tasks to be processed to provide employees of an enterprise with remote desktop sessions or other virtualized computing sessions.

The management service 145 can include a life cycle manager 139 and a third-party upgrade manager 142. The life cycle manager 139 can manage the deployment, upgrades, and configuration of the systems associated with the operation of the virtualized computing environment and the computing resources that make up the computing systems 106. A data center administrator or cloud computing operator can interact with the life cycle manager 139 using the management console 148 accessible by a client device 116 to schedule, initiate, and configure upgrades for software systems associated with the operation of the virtualized computing environment. The life cycle manager 139 can identify and download the appropriate upgrade bundles 124 for a requested system update. In some examples, the life cycle manager 139 can select a particular upgrade bundle 124 from a plurality of upgrade bundles 124 according to the software system to be upgraded and a version associated with the requested system.

The third-party upgrade manager 142 can manage the upgrade of third-party services associated with the computing services 114 or other software-based systems of the networked environment 100. The third-party upgrade manager 142 can interact with the life cycle manager 139 to manage the upgrades associated with different third-party services. For example, the third-party upgrade manager 142 can unpack the upgrade bundle 124 obtained by the life cycle manager 139 and initiate the upgrades of third-party services according to the predefined sequence within the manifest 133. In some examples, as shown in FIG. 1, the third-party upgrade manager 142 is a plug-in or other type of standalone application. In other examples, the third-party upgrade manager 142 can be integrated within the life cycle manager 139 such that the third-party upgrade manager 142 is a component of the life cycle manager 139.

The management console 148 can provide an administrative interface for configuring the operation of individual components in the networked environment 100. For instance, the management console 148 can provide an administrative interface for the management service 145. As an example, the management console 148 can provide a user interface to allow notify an administrative user of available upgrades associated with computing services or resources of the networked environment 100. The management console 148 can also provide a user interface to allow the administrative user to request upgrades and view the status associated with the requested upgrades. Accordingly, the management console 148 can correspond to a web page or a web application provided by a web server hosted in the computing environment 103. In other implementations, however, the management console 148 can be implemented as a dedicated or standalone application.

Turning now to FIG. 2, shown is an example manifest 133 that can be included in an upgrade bundle 124 and used by the third-party upgrade manager 142 or the life cycle manager 139 when updating the third-party services used in the implementation of and operation of a data center. The manifest 133 provides a centralized list of third-party upgrades associated with a particular system upgrade. In some examples, the manifest 133 can be generated by a user tasked with identifying dependencies associated with different services and versions of services. Another benefit of the manifest 133 is that the different versions of services can be managed and mapped to a single version of the overall system that implements the services.

As shown in FIG. 2, the manifest 133 identifies a manifest version and the different upgrade elements 202 (e.g., 202*a*, 202*b*, 202*c*) to be updated with respect to the manifest version. The manifest 133 lists the upgrade elements 202 in the order in which they are to be executed. For example, in the manifest of FIG. 2, upgrade element 202*a* will be executed before upgrade element 202*b* and 202*c*.

For each upgrade element 202, the manifest can include an executable handle 204 (e.g., 204*a*, 204*b*, 204*c*), an executable name, an executable type, executable parameters, a status file location, status summaries, a timeout value, and other information. The executable handle 204 corresponds to a location of where the executable code for the upgrade can be found. In some examples, the executable code can be local to the computing environment 103. In other examples, the executable code can be stored in a remote location that is accessible over the network 109. For example, the executable code can be obtained from a third-party service provider associated with the given upgrade. The executable name corresponds to a name associated with the given upgrade. The executable type can define the type of executable associated with the upgrade. For example, the executable type for each of the upgrade elements 202 is PYTHON. However, the executable type can vary as can be appreciated. Other features that can be included in the manifest can include a status file location which defines a location of a status file associated with the execution of the upgrade executable 136 for the given upgrade element 202. The third-party upgrade manager 142 or the life cycle manager 139 can determine the status associated with the given upgrade by accessing the status file associated with the execution of the third-party upgrade executable 136 for the given upgrade element 202. Therefore, the third-party upgrade manager 142 or the life cycle manager 139 can use the location provided in the manifest 133 to determine the current upgrade status and modify the upgrade status log 127 according to the status obtained from the respective status file.

Another feature that can be included in the manifest 133 is a timeout value. The timeout value can correspond to a maximum amount of time for a particular upgrade. The third-party upgrade manager 142 or the life cycle manager 139 tracks the amount of time that has lapsed since the start of the execution of a particular upgrade. If an upgrade time exceeds the timeout value, the third-party upgrade manager 142 or the life cycle manager 139 can halt the overall upgrade and generate an error message. The error message can signify that the upgrade failed due to the timeout.

In some examples, the manifest 133 can include a user-defined summary associated with the upgrade. For example, the summary associated with upgrade element 202*b* states that "Upgrading base OS rpms as part of LCM self-upgrade." The third-party upgrade manager 142 or the life cycle manager 139 can include this summary in the upgrade status log 127 that is provided to an administrator and notifies the administrator which components are being updated.

Figure 3:
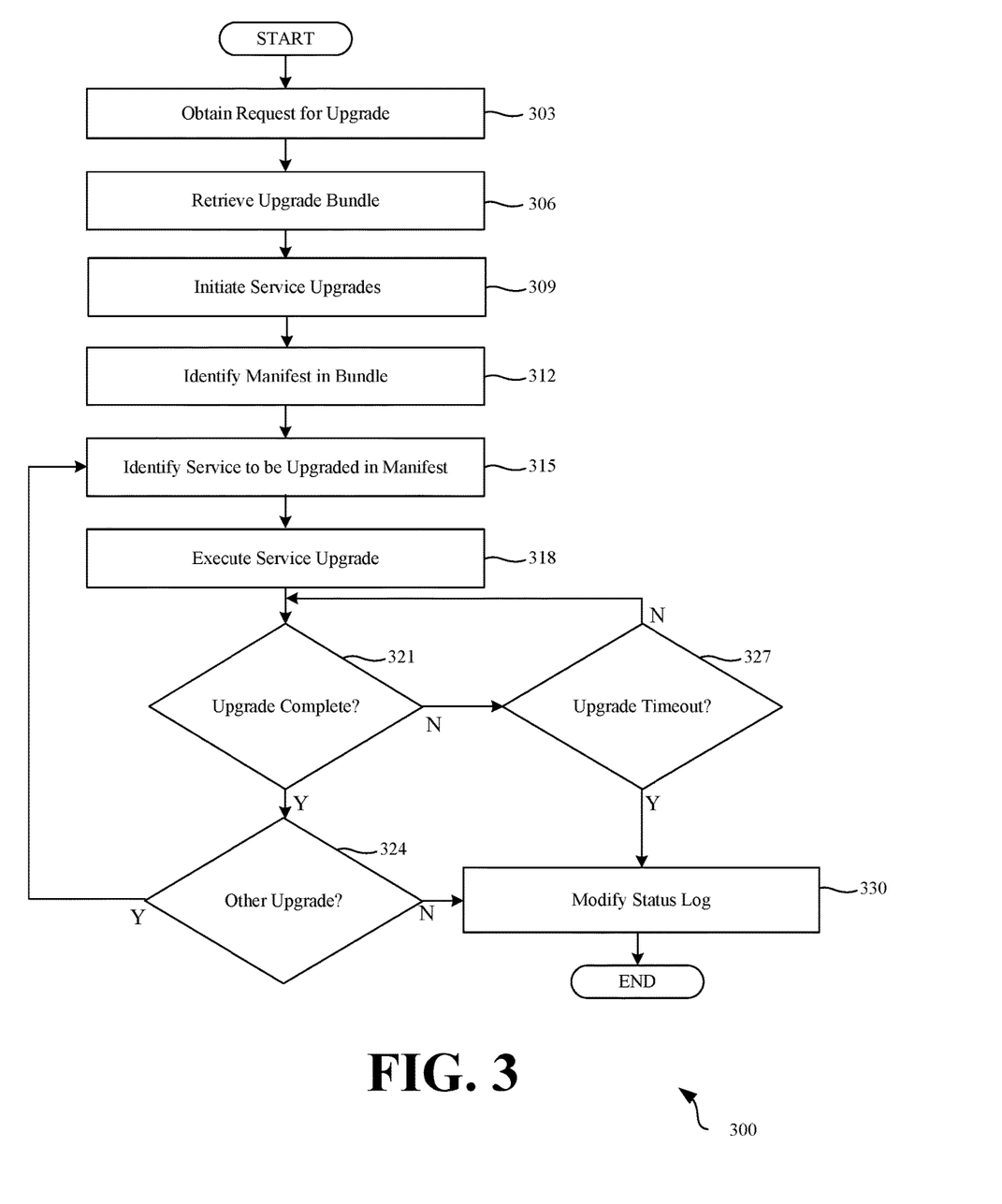
FIG. 3 is a flowchart that illustrates functionality implemented by components of the network environment of FIG. 1.

Moving on to FIG. 3, shown is a flowchart 300 that provides one example of the operation of a portion of the network environment 100. The flowchart of FIG. 3 can be viewed as depicting an example of elements of a method implemented by the management service management service 145, life cycle manager 139, third-party upgrade manager 142, or other components executing in the computing environment 103. The separation or segmentation of functionality as discussed herein is presented for illustrative purposes only.

Beginning with step 303, the life cycle manager 139 can obtain a request for an upgrade of a software-based system of virtualized computing environments from an administrator or other cloud computing operator. The request can be obtained from the management console 148 that is accessed by a user. In some examples, the user can interact with the management service 145 using the management console 148 to manage and build a virtualized cloud computing environment for an enterprise. Through interactions with the life cycle manager 139, the administrator can be notified of upgrades that are available with respect to different software systems of the virtualized environment managed by the management service 145. Using the management console 148, the administrator can then request an upgrade of a particular system or portion of the system, and the request is received by the life cycle manager 139.

At step 306, the life cycle manager 139 can retrieve the upgrade bundle 124 associated with the requested upgrade from the data store 121. In some examples, the life cycle manager 139 can determine the version of the system to be upgraded and can select the appropriate upgrade bundle 124 from a plurality of upgrade bundles 124 based on the version. For example, if the currently installed version of the product is 2.0, the life cycle manager 139 can determine that the requested upgrade version is 2.1. In some examples, the request can include the version associated with the requested upgrade.

At step 309, the life cycle manager 139 can initiate the third-party service upgrades. In some examples, the life cycle manager 139 can provide the third-party upgrade manager 142 with the upgrade bundle 124, and the third-party upgrade manager 142 can unpack the bundle to allow access to the different files, executable files, status logs, the manifest 133, and other information included in the bundle. The manifest 133 can be specific to the third-party service upgrades associated with different third-party service providers. The third-party upgrade manager 142 can also create an upgrade status log 127 that is associated with the given upgrade.

At step 312, the third-party upgrade manager 142 or the life cycle manager 139 can identify the manifest 133 included in the upgrade bundle 124. The manifest 133 includes an identification of the service upgrades associated with the requested upgrade.

At step 315, the third-party upgrade manager 142 or the life cycle manager 139 identifies a service to be upgraded in the manifest 133. The third-party upgrade manager 142 or the life cycle manager 139 can parse the manifest to identify the different upgrade elements 202 that correspond with the different services. As the manifest 133 provides a sequence in which the different services are to be upgraded, the third-party upgrade manager 142 or the life cycle manager 139 can initially identity the first upgrade element 202 in the predefined sequence.

At step 318, the third-party upgrade manager 142 or the life cycle manager 139 executes a service upgrade associated with the identified service. To execute the service upgrade, the third-party upgrade manager 142 or the life cycle manager 139 identifies the executable handle 204 of the upgrade element 202 corresponding to the identified service. The third-party upgrade manager 142 or the life cycle manager 139 can send a call using the executable handle 204 to execute the corresponding upgrade executable 136.

At step 321, the third-party upgrade manager 142 or the life cycle manager 139 determines whether the upgrade is complete. The manifest 133 can include a location of a status file created by the third-party upgrade executable 136 upon being executed. The third-party upgrade manager 142 or the life cycle manager 139 can access the status file based on the location provided in the manifest 133 to determine the status of the given upgrade. If the status file indicates that the upgrade is complete, the third-party upgrade manager 142 or the life cycle manager 139 proceeds to step 324.

In step 324, third-party upgrade manager 142 or the life cycle manager 139 determines if there is another upgrade to complete. For example, if there are other upgrades listed in the manifest 133 that have not been executed, the third-party upgrade manager 142 or the life cycle manager 139 will determine that there is another upgrade to execute and will return to step 315 to identify the next upgrade to execute according to the predefined sequence. If there are no other upgrades to complete, the third-party upgrade manager 142 or the life cycle manager 139 will proceed to step 330.

Returning to step 321, if the third-party upgrade manager 142 or the life cycle manager 139 determines that the upgrade is not complete, the third-party upgrade manager 142 or the life cycle manager 139 proceeds to step 327.

At step 327, the third-party upgrade manager 142 or the life cycle manager 139 determines whether a timeout has occurred with respect to the particular service upgrade. For example, the third-party upgrade manager 142 or the life cycle manager 139 can compare an amount of time elapsed from the start of the given service upgrade with the timeout value provided in the manifest 133. If the amount of time elapsed exceeds the timeout value, the third-party upgrade manager 142 or the life cycle manager 139 proceeds to step 330. Otherwise, the third-party upgrade manager 142 or the life cycle manager 139 returns to step 321.

At step 330, the third-party upgrade manager 142 or the life cycle manager 139 modifies the upgrade status log 127. If there has been a timeout associated with the upgrade, third-party upgrade manager 142 or the life cycle manager 139 modifies the upgrade status log 127 to include an error message associated with the upgrade. The error message can indicate that the upgrade for a given service did not complete in the expected time. If all of the upgrades have been completed, the third-party upgrade manager 142 or the life cycle manager 139 can modify the upgrade status log 127 to indicate the completion of the service upgrades. Although FIG. 3 illustrates the upgrade status log 127 being modified at the completion of all of the upgrades, the upgrade status log 127 can be modified upon the completion of each upgrade listed in the manifest 133. Upon updating the status log 127 to indicate completion of the service upgrades or an error associated with the service upgrades, the process can proceed to completion.

Stored in the memory device are both data and several components that are executable by the processor. Also stored in the memory can be a data store and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices can be used to access user interfaces generated to configure or otherwise interact with the management service 145. These client devices can include a display upon which a user interface generated by a client application for providing a virtual desktop session (or other session) can be rendered. In some examples, the user interface can be generated using user interface data provided by the computing environment 103. The client device can also include one or more input/output devices that can include, for example, a capacitive touchscreen or other type of touch input device, fingerprint reader, or keyboard.

Although the management service 145 and other systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for upgrading services for a virtualized computing environment, comprising:
at least one computing device; and
at least one application executable by the at least one computing device, wherein, when executed, the at least one application causes the at least one computing device to at least:
receive a request to upgrade the services associated with the virtualized computing environment;
obtain an upgrade bundle comprising a manifest file including a centralized list of upgrade elements corresponding to the services to be upgraded, the upgrade elements being arranged in the centralized list according to a user-defined order for upgrading the services, individual upgrade elements corresponding to a respective service to be upgraded, and the individual upgrade elements comprising a respective location of executable code, a respective executable name, a respective executable type, a respective timeout value, and respective version information, the respective timeout value representing a maximum time associated with a respective service upgrade for each upgrade element in the centralized list;
for the services and in the user-defined order defined in the manifest file:
execute the respective service upgrade for the respective service in the manifest file;
determine whether the respective service upgrade is complete;
in an instance in with the respective service upgrade is determined to be complete, modify a status log to indicate completion of the respective service upgrade, the status log being modified to include a respective predefined summary text that is included in the manifest file, and the status log comprising a unified status summary associated with all of the services that have been upgraded; and
in an instance in with the respective service upgrade in incomplete,
determine that an amount of time executing the respective service upgrade exceeds the maximum time; and
modify the status log to include an error message to indicate an error in the respective service upgrade; and
send the status log to a client device.

2. The system of claim 1, wherein the user-defined order is based on one or more dependencies between the services.

3. The system of claim 1, wherein a first location for a first service update is in a local storage associated with the at least one computing device and a second location for a second service update is in a remote storage associated with a third-party entity.

4. The system of claim 1, wherein the services are associated with a software-based system of the virtualized computing environment, and wherein, when executed, the at least one application causes the at least one computing device to select the upgrade bundle from available upgrade bundles based on a version of the software-based system of the virtualized computing environment.

5. The system of claim 1, wherein the manifest file further comprises a respective status file location for the respective service, and further comprising, accessing the respective status file location to determine a status for the respective service upgrade, and determining that the respective service upgrade is complete is based on accessing the respective status file location.

6. The system of claim 1, wherein, when executed, the at least one application causes the at least one computing device to:
terminate an overall upgrade of the services in an instance in which the amount of time executing the respective service upgrade exceeds the maximum time; and
generate another error message indicating a failure of the upgrade due to timeout of the respective service upgrade.

7. A non-transitory computer-readable medium embodying executable instructions, which, when executed by a processor, cause at least one computing device to at least:
receive a request to upgrade services associated with a virtualized computing environment;
obtain an upgrade bundle comprising a manifest file including a centralized list of upgrade elements corresponding to the services to be upgraded, the upgrade elements being arranged in the centralized list according to a user-defined order for upgrading the services, individual upgrade elements corresponding to a respective service to be upgraded, and the individual upgrade elements comprising a respective location of executable code, a respective executable name, a respective executable type, a respective timeout value, and respective version information, the respective timeout value representing a maximum time associated with a respective service upgrade for each upgrade element in the centralized list; and
for the services and in the user-defined order defined in the manifest file:
execute the respective service upgrade for the respective service in the manifest file;
determine whether the respective service upgrade is complete;
in an instance in with the respective service upgrade is determined to be complete, modify a status log to indicate completion of the respective service upgrade, the status log being modified to include a respective predefined summary text that is included in the manifest file, and the status log comprising a unified status summary associated with all of the services that have been upgraded; and
in an instance in with the respective service upgrade in incomplete,
determine that an amount of time executing the respective service upgrade exceeds the maximum time; and
modify the status log to include an error message to indicate an error in the respective service upgrade; and
send the status log to a client device.

8. The non-transitory computer-readable medium of claim 7, wherein at least a portion of the services are provided by a plurality of different third-party service providers.

9. The non-transitory computer-readable medium of claim 7, wherein the user-defined order is based on one or more dependencies between the services.

10. The non-transitory computer-readable medium of claim 7, wherein a first location for a first service update is in a local storage associated with the at least one computing device and a second location for a second service update is in a remote storage associated with a third-party entity.

11. The non-transitory computer-readable medium of claim 7, wherein the services are associated with a software-based system of the virtualized computing environment, and when executed, the executable instructions further cause the at least one computing device to at least select the upgrade bundle from available upgrade bundles based on a version of the software-based system of the virtualized computing environment.

12. The non-transitory computer-readable medium of claim 7, wherein the manifest file further comprises a respective status file location for the respective service, and further comprising, accessing the respective status file location to determine a status for the respective service upgrade, and determining that the respective service upgrade is complete is based on accessing the respective status file location.

13. The non-transitory computer-readable medium of claim 7, wherein, when executed, the executable instructions further cause the at least one computing device to at least:
terminate an overall upgrade of the services in an instance in which the amount of time executing the respective service upgrade exceeds the maximum time; and
generate another error message indicating a failure of the upgrade due to timeout of the respective service upgrade.

14. A computer-implemented method for upgrading services for a virtualized computing environment, comprising:
receiving, by at least one computing device, a request to upgrade the services associated with the virtualized computing environment;
obtaining, by the at least one computing device, an upgrade bundle comprising a manifest file including a centralized list of upgrade elements corresponding to the services to be upgraded, the upgrade elements being arranged in the centralized list according to user-defined order for upgrading the services, individual upgrade elements corresponding to a respective service to be upgraded, and the individual upgrade elements comprising a respective location of executable code, a respective executable name, a respective executable type, a respective timeout value, and respective version information; the respective timeout value representing a maximum time associated with a respective service upgrade for each upgrade element in the centralized list;
for the services and in the user-defined order defined in the manifest file:
executing, in the at least one computing device, the respective service upgrade for the respective service in the manifest file;
determining, by the at least one computing device, that whether the respective service upgrade is complete;
in an instance in with the respective service upgrade is determined to be complete, updating, by the at least one computing device, a status log associated with the respective service upgrade, the status log being modified to include a respective predefined summary text that is included in the manifest file, and the status log comprising a unified status summary associated with all of the services that have been upgraded; and
in an instance in with the respective service upgrade in incomplete,
determining, by the at least one computing device, that an amount of time executing the respective service upgrade exceeds the maximum time; and
modifying, by the at least one computing device, the status log to include an error message to indicate an error in the respective service upgrade; and
sending, by the at least one computing device, the status log to a client device.

15. The computer-implemented method of claim 14, wherein at least a portion of the services are provided by a plurality of different third-party service providers.

16. The computer-implemented method of claim 14, wherein the user-defined order is based on one or more dependencies between the services.

17. The computer-implemented method of claim 14, wherein a first location for a first service update is in a local storage associated with the at least one computing device and a second location for a second service update is in a remote storage associated with a third-party entity.

18. The computer-implemented method of claim 14, wherein the services are associated with a software-based system of the virtualized computing environment, and the method further comprises selecting the upgrade bundle from available upgrade bundles based on a version of the software-based system of the virtualized computing environment.

19. The computer-implemented method of claim 14, wherein the manifest file further comprises a respective status file location for the respective service, and further comprising, accessing the respective status file location to determine a status for the respective service upgrade, and determining that the respective service upgrade is complete is based on accessing the respective status file location.

20. The computer-implemented method of claim 14, further comprising:
   terminating, by the at least one computing device, an overall upgrade of the services in an instance in which the amount of time executing the respective service upgrade exceeds the maximum time; and
   generating, by the at least one computing device, another error message indicating a failure of the upgrade due to timeout of the respective service upgrade.

\* \* \* \* \*